(12) United States Patent
Romzek (10) Patent No.: US 6,457,461 B1
(45) Date of Patent: Oct. 1, 2002

(54) EGR AND VGT SYSTEM DIAGNOSTICS AND CONTROL

(75) Inventor: Martin Romzek, Dearborn, MI (US)

(73) Assignee: Detroit Diesel Corporation, Detroit, MI (US)

( * ) Notice: Subject to any disclaimer, the term of this patent is extended or adjusted under 35 U.S.C. 154(b) by 0 days.

(21) Appl. No.: 09/849,681

(22) Filed: May 4, 2001

(51) Int. Cl.$^7$ .......................... F02M 25/07; F02B 37/12; F02B 47/08

(52) U.S. Cl. .................... 123/568.16; 60/602; 60/605.2; 701/108

(58) Field of Search ..................... 123/568.11, 568.12, 123/568.16, 568.21; 60/602, 605.2; 73/117.3, 118.1; 701/108

(56) References Cited

U.S. PATENT DOCUMENTS

| | | | |
|---|---|---|---|
| 5,257,534 A | * 11/1993 | Azuma et al. | 73/118.1 |
| 5,778,674 A | * 7/1998 | Kimura | 60/605.2 |
| 6,085,732 A | 7/2000 | Wang et al. | |
| 6,128,902 A | * 10/2000 | Kolmanovsky et al. | 60/605.2 |
| 6,164,270 A | 12/2000 | Bidner et al. | |
| 6,247,311 B1 | * 6/2001 | Itoyama et al. | 60/602 |
| 6,305,167 B1 | * 10/2001 | Weisman, II et al. | 60/602 |
| 6,308,517 B1 | * 10/2001 | Fausten et al. | 60/605.2 |
| 6,314,735 B1 | * 11/2001 | Kolmanovsky et al. | 60/605.2 |
| 6,347,519 B1 | * 2/2002 | Kreso | 60/605.2 |
| 6,360,541 B2 | * 3/2002 | Waszkiewicz et al. | 60/605.2 |
| 6,363,922 B1 | * 4/2002 | Romzek et al. | 123/568.16 |
| 2001/0045209 A1 | * 11/2001 | Balekai et al. | 123/568.12 |

\* cited by examiner

*Primary Examiner*—Willis R. Wolfe
(74) *Attorney, Agent, or Firm*—Brooks & Kushman P.C.

(57) ABSTRACT

A system and method for diagnosing a component failure in an internal combustion engine having an exhaust gas recirculation system and a variable geometry turbocharger for diverting exhaust gas from an engine exhaust to an engine intake include determining whether the engine is operating in boost control mode or EGR control mode, comparing EGR flow rate to a threshold corresponding to the current control mode, generating a fault if the EGR flow rate is outside an acceptable operating range based on the threshold for a first predetermined time period, and operating in boost control mode if the fault persists for a second predetermined time period. In one embodiment, the system and method determine that the engine is operating in the EGR control mode with the threshold corresponding to a minimum EGR flow rate and determine whether the EGR flow rate exceeds the threshold. The system and method then determine whether the EGR flow rate is within an acceptable operating range relative to a desired EGR flow rate and generate a VGT fault if the EGR flow rate is outside of the acceptable operating range but exceeds the minimum threshold. Likewise, the system and method generate an EGR fault if the EGR flow rate is less than the minimum threshold. When operating in the boost control mode, the system and method generate an EGR fault if the EGR mass flow rate exceeds a maximum flow rate and generate a VGT fault if the turbo boost pressure is not within an acceptable operating range of a desired boost pressure.

20 Claims, 5 Drawing Sheets

EGR AND VGT SYSTEM DIAGNOSTICS AND CONTROL

TECHNICAL FIELD

The present invention relates to systems and methods for diagnosing interrelated component failures in an internal combustion engine.

BACKGROUND ART

To improve performance, many internal combustion engines, particularly diesel engines, include a turbocharger to increase the oxygen density of the cylinder charge. Turbochargers use the engine exhaust gases to operate a turbine which in turn powers a compressor to compress intake air. Variable geometry turbochargers (VGT), which include variable nozzle turbochargers (VNT), are used to modify turbocharger characteristics over a broader engine operating range than possible with conventional turbochargers. Moveable intake or exhaust vanes (VNT) or a moveable turbine sidewall may be used to provide an appropriate amount of turbo boost pressure for current operating conditions and driver demanded engine torque.

Exhaust gas recirculation (EGR) has known advantages with respect to reducing emissions of nitrogen oxides (NOx) by reducing peak combustion temperatures within the engine cylinders. EGR systems typically include an EGR valve which diverts engine exhaust gases from the engine exhaust manifold to the engine intake manifold. This requires a pressure differential between the exhaust and intake manifolds for the gas to flow from the exhaust to the intake. Naturally aspirated engines typically create a vacuum at the intake and have a considerably higher exhaust gas pressure which easily flows any desired amount of EGR. For turbocharged engines, additional back pressure may be required to provide a sufficient pressure differential to introduce the exhaust gas into the compressed intake air. One method for controlling back pressure is to modify the geometry of a VNT or VGT.

As such, to achieve the benefits associated with EGR, both the EGR system components and VGT system components should be in proper working order. Various diagnostics have been developed to monitor the EGR system and VGT system. However, because the systems are interrelated, it may be difficult to distinguish between component malfunctions associated with the EGR system from component malfunctions associated with the VGT system. This may lead to additional troubleshooting time for service and maintenance personnel when a fault occurs. In addition, corrective engine/vehicle control is more difficult to properly implement if there is a low confidence level associated with a particular generated fault code.

DISCLOSURE OF INVENTION

One object of the present invention is to provide a system and method for diagnosing an EGR system and/or VGT system related component degradation or failure.

Another object of the present invention is to provide a system and method for controlling an internal combustion engine in response to a fault associated with an EGR or VGT system component malfunction.

In carrying out the above objects and other objects, features, and advantages of the present invention, a system and method for diagnosing a component failure in an internal combustion engine having an exhaust gas recirculation system and a variable geometry turbocharger for diverting exhaust gas from an engine exhaust to an engine intake include determining whether the engine is operating in boost control mode or EGR control mode, comparing EGR flow rate to a threshold corresponding to the current control mode, generating a fault if the EGR flow rate is outside an acceptable operating range based on the threshold for a first predetermined time period, and operating in boost control mode if the fault persists for a second predetermined time period. In one embodiment, the system and method determine that the engine is operating in the EGR control mode with the threshold corresponding to a minimum EGR flow rate and determine whether the EGR flow rate exceeds the threshold. The system and method then determine whether the EGR flow rate is within an acceptable operating range of a desired EGR flow rate and generate a VGT fault if the EGR flow rate is outside of the acceptable operating range but exceeds the minimum threshold. Likewise, the system and method generate an EGR fault if the EGR flow rate is less than the minimum threshold. When operating in the boost control mode, the system and method generate an EGR fault if the EGR mass flow rate exceeds a maximum flow rate and generate a VGT fault if the turbo boost pressure is not within an acceptable operating range of a desired boost pressure.

A number of advantages are associated with the present invention. For example, the present invention provides a system and method for more accurate and reliable diagnosis and control of interrelated engine components. In particular, the present invention provides a method for differentiating between VGT and EGR related faults, activating an appropriate fault code, and/or modifying the engine control accordingly. More accurate fault codes may reduce the time necessary for service and maintenance personnel to troubleshoot and correct the root cause of any problem. In addition, engine control may be adjusted based on the fault to ameliorate the effects of a degraded or failed component.

The above features, benefits and advantages and other features, benefits and advantages of the present invention are readily apparent from the following detailed description of the best mode for carrying out the invention when taken together with the accompanying drawings.

BEST MODE FOR CARRYING OUT THE INVENTION

Figure 1:
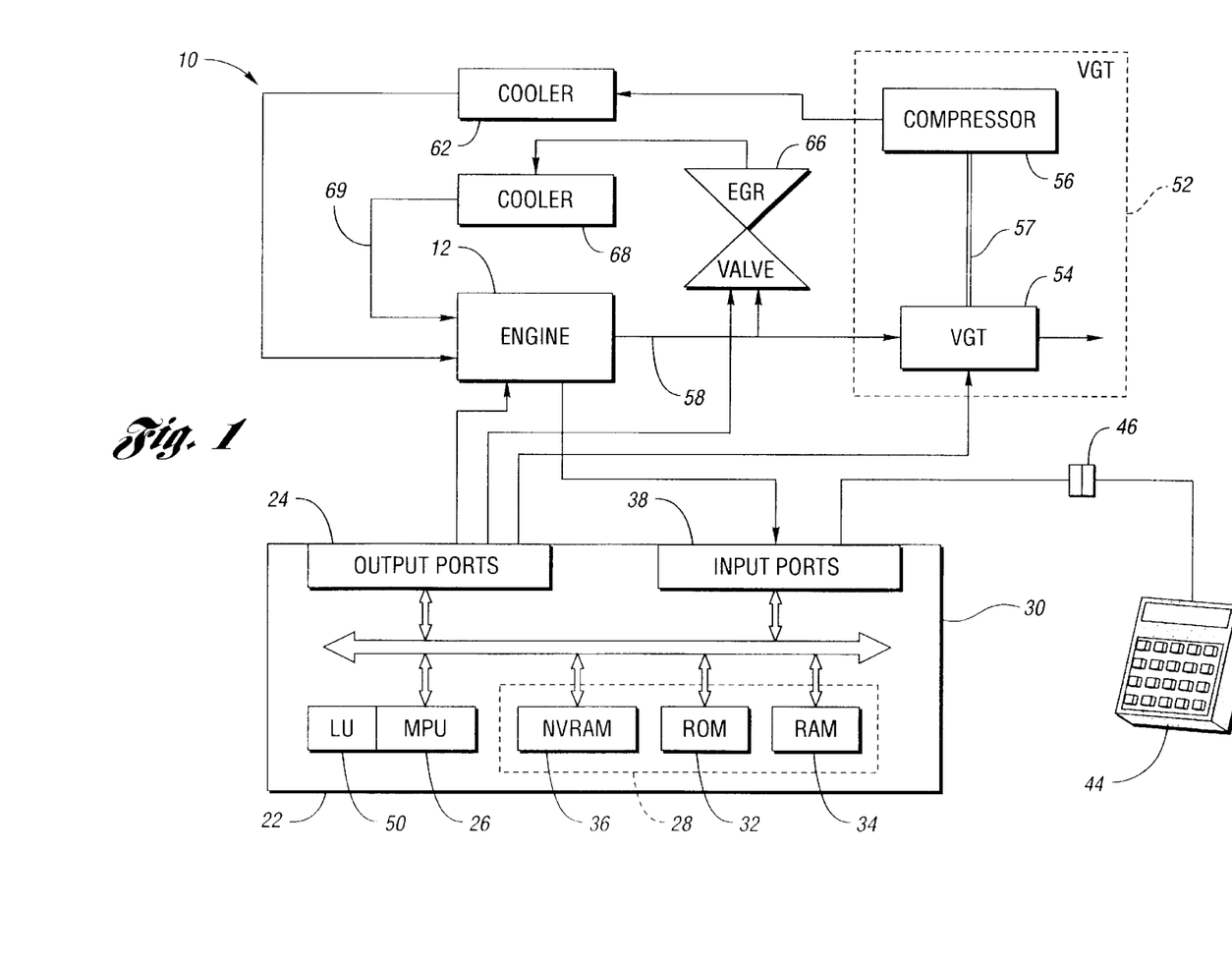
FIG. 1 is a schematic diagram illustrating operation of a system or method for EGR./VGT diagnosis and control according to one embodiment of the present invention.

With reference to FIG. 1, an internal combustion engine and associated control systems and subsystems are generally indicated at 10. System 10 includes an engine 12 having a plurality of cylinders, each fed by a fuel injector. In a preferred embodiment, engine 12 is a compression-ignition internal combustion engine, such as a heavy duty diesel engine. The injectors receive pressurized fuel from a fuel supply in a known manner. Various sensors are in electrical communication with a controller 22 via input ports 24. Controller 22 preferably includes a microprocessor 26 in communication with various computer readable storage media 28 via data and control bus 30. Computer readable storage media 28 may include any of a number of known devices which function as read only memory 32, random access memory 34, and non-volatile random access memory 36.

Computer readable storage media 28 have instructions stored thereon that are executable by controller 22 to perform methods of controlling the internal combustion engine, including variable flow exhaust gas recirculation (EGR) valve 66 and variable geometry turbocharger 52. The program instructions are executed by controller 22 in microprocessor 26 to control the various systems and subsystems of the engine and/or vehicle. In addition, various instructions may also be executed by any number of logic units 50. Input ports 24 receive signals from various sensors, and controller 22 generates signals at output ports 38 that are directed to the various engine and/or vehicle components.

A data, diagnostics, and programming interface 44 may also be selectively connected to controller 22 via a plug 46 to exchange various information therebetween. Interface 44 may be used to change values within the computer readable storage media 28, such as configuration settings, calibration variables, instructions for EGR and VGT control and others.

In operation, controller 22 receives signals from the various engine/vehicle sensors and executes control logic embedded in hardware and/or software to control the engine. In a preferred embodiment, controller 22 is the DDEC controller available from Detroit Diesel Corporation, Detroit, Mich. Various other features of this controller are described in detail in a number of U.S. patents assigned to Detroit Diesel Corporation. Control logic may be implemented in hardware, firmware, software, or combinations thereof. Further, control logic may be executed by controller 22, in addition to by any of the various systems and subsystems of the vehicle cooperating with controller 22. Further, although in a preferred embodiment, controller 22 includes microprocessor 26, any of a number of known programming and processing techniques or strategies may be used to control an engine in accordance with the present invention.

With continuing reference to FIG. 1, controller 22 provides enhanced engine performance by controlling a variable flow exhaust gas recirculation valve 66 and a variable geometry turbocharger 52. Variable geometry turbocharger 52 includes a turbine 54 and a compressor 56 mounted on a common shaft 57. The pressure of the engine exhaust gasses causes the turbine to spin which in turn drives the compressor. The spinning compressor creates turbo boost pressure which develops increased power during combustion.

A variable geometry or variable nozzle turbocharger has moveable components in addition to the rotor group. These moveable components can change the turbocharger geometry by changing the area or areas in the turbine stage through which exhaust gasses from the engine flow, and/or changing the angle at which the exhaust gasses enter or leave the turbine. Depending upon the turbocharger geometry, the turbocharger supplies varying amounts of turbo boost pressure to the engine. The variable geometry turbocharger may be electronically controlled to vary the amount of turbo boost pressure based on various operating conditions.

In a typical variable geometry turbocharger, the turbine housing is oversized for an engine, and the air flow is choked down to the desired level. There are several designs for the variable geometry turbocharger. In one design, a variable inlet nozzle has a cascade of moveable vanes which are pivotable to change the area and angle at which the airflow enters the turbine wheel. In another design, the turbocharger has a moveable side wall which varies the effective cross-sectional area of the turbine housing. It is appreciated that embodiments of the present invention are not limited to any particular structure for the variable geometry turbocharger. That is, the term VGT or VNT as used herein means any controllable air pressurizing device including the above examples, and including a modulated waste gate valve.

An exhaust gas recirculation system selectively introduces a metered portion of the exhaust gasses into the intake manifold 69. The EGR system dilutes the incoming fuel charge and lowers peak combustion temperatures to reduce the amount of oxides of nitrogen produced during combustion. The amount of exhaust gas to be recirculated is controlled by EGR valve 66 and VGT 52. In accordance with the present invention, the EGR valve is a variable flow valve that is electronically controlled by controller 22. The geometry of the variable geometry turbocharger is also electronically controlled by controller 22. There are many possible configurations for a controllable EGR valve and embodiments of the present invention are not limited to any particular structure for the EGR valve. Likewise, various sensors may be used to monitor and control the EGR circuit including temperature and differential pressure sensors which allow the controller to determine the mass flow rate through the valve. In addition, it is appreciated that various different sensor configurations may be utilized in various parts of the exhaust flow paths to allow controller 22 to determine the various mass flow rates throughout the exhaust system, including flow through the EGR system and flow through the compressor, etc. depending on the particular application.

In some embodiments, it may be desirable to provide a cooler 62 to cool the charge air coming from compressor 56. Similarly, in some embodiments, it may be desirable to provide a cooler 68 to cool the flow through the EGR system prior to reintroduction into the intake manifold of engine 12 to further reduce peak combustion temperatures and the production of nitrogen oxides.

Embodiments of the present invention include control logic that processes various inputs representing various engine conditions, and in turn, provides an EGR command signal and a VGT command signal. The EGR command signal commands a position for the variable flow EGR valve 66 to control gas flow through path 64, while the VGT command signal commands a geometry for VGT 52 to control gas flow through path 60. In a preferred embodiment of the present invention, the various techniques utilized to determine the EGR and VGT command signals are best shown in FIG. 2.

Figure 2A:
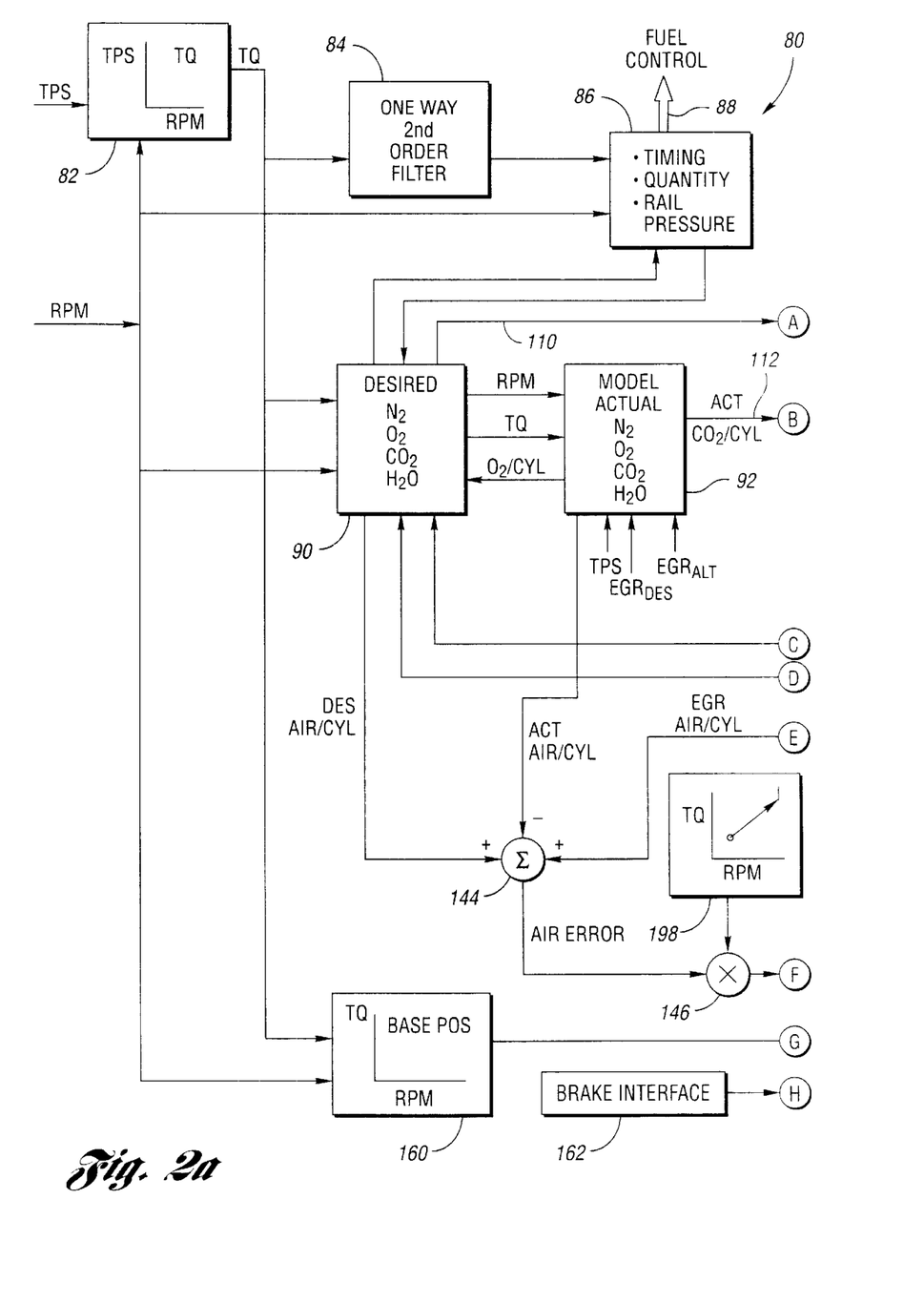
FIG. 2 is a block diagram illustrating control logic for EGR and VGT circuits according to one embodiment of the present invention.
Figure 2B:
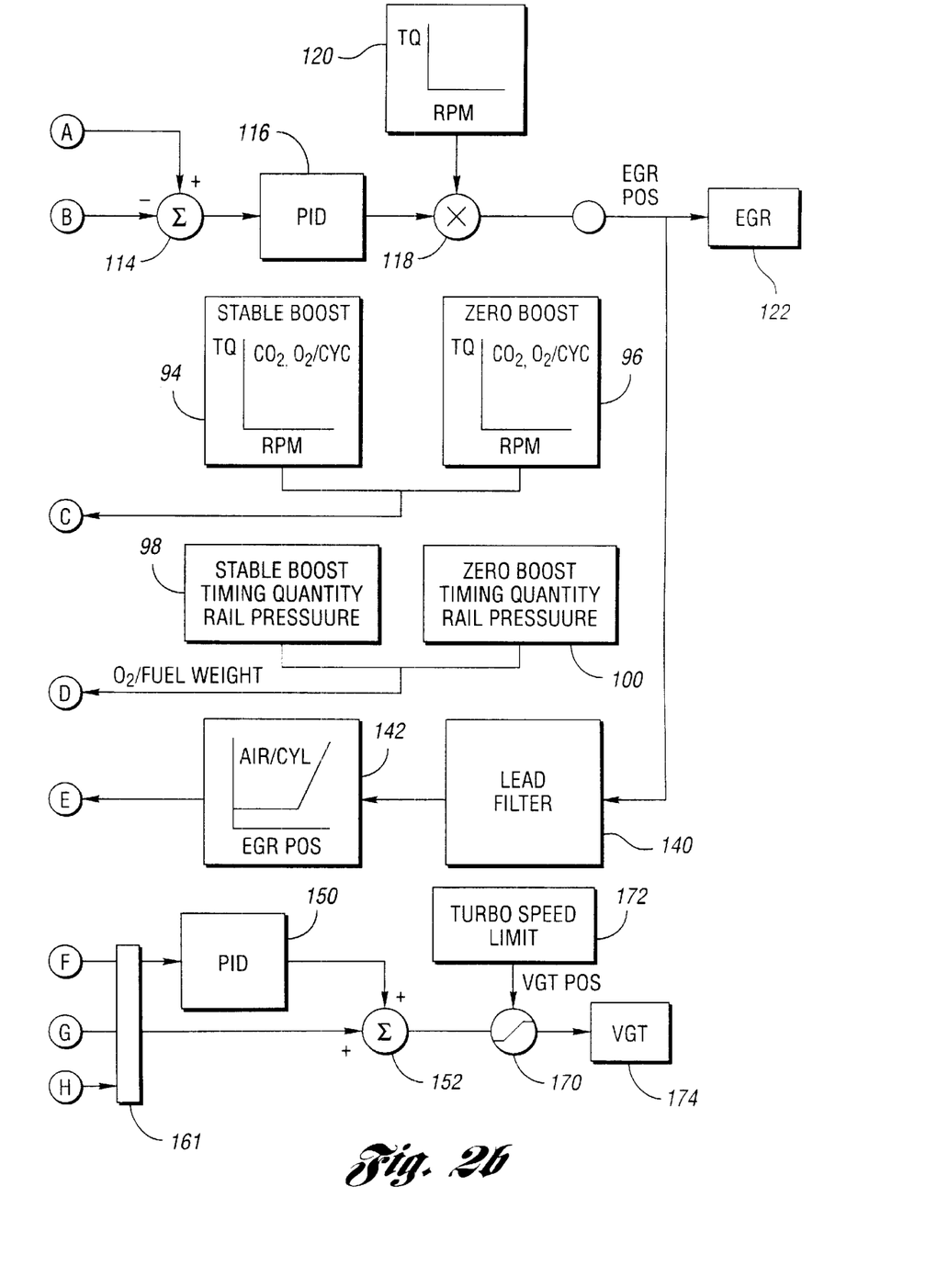

In FIG. 2, a block diagram 80 illustrates the functions of the control logic, including instructions, executed by controller 22 to provide enhanced engine performance and improved emission control. Embodiments of the present invention are particularly useful to improve emissions on heavy-duty diesel engines. Using EGR technology to mix a portion of exhaust gas with the intake charge reduces emissions of oxides of nitrogen ($NO_x$), while minimizing fuel economy impact and improving durability, in accordance with the present invention. In a turbocharged diesel engine, the back pressure necessary to drive the EGR flow from exhaust to intake manifold is provided by the variable geometry turbocharger. The control of the EGR flow rate may be achieved by changing the geometry of the VGT (for example, vane position change), by changing the EGR valve position, and preferably via a combination of both. In preferred embodiments, the method of control employed results in interactions between EGR and VGT systems that are beyond the capabilities of existing systems.

There are many aspects of the present invention that may be used separately or together. In the preferred embodiment, the EGR valve and the VGT are controlled simultaneously and continuously. Preferred implementations of the present invention utilize desired intake manifold composition in terms of chemical species ($O_2$, $N_2$, $CO_2$ and $H_2O$) as a set point for the EGR/VGT controller. The actual quantity of these chemical species is preferably calculated from a simplified combustion model.

With continuing reference to FIG. 2, in the embodiment illustrated, a driver accelerator pedal position sensor input and an engine speed (rpm) input are received at block 82. Block 82 utilizes a look up table to determine an engine torque demand. The engine torque demand represents a fuel quantity that may be adjusted for other aspects of engine control that are not specifically described herein such as, for example, cylinder balancing. Further, it is appreciated that FIG. 2 illustrates a preferred implementation and that various aspects of the control strategy shown are preferred, but not specifically required. At block 84, a one way, second order filter adds some delay to the torque demand. Delay is added to allow the slower, air flow aspects of engine control to catch up to the faster responding torque demand aspects of engine control. At block 86, engine speed and filtered torque demand are received, and processed along with other engine conditions, resulting in desired fuel injection timing, quantity, and rail pressure. These factors control fuel delivery, indicated at 88.

At block 90, a desired chemical composition for the engine air intake is determined. The desired composition is in terms of chemical species ($N_2$, $O_2$, $CO_2$, and $H_2O$). The fuel per cycle is provided to block 90 from injection control block 86, and block 90 provides a fuel limit per cycle to block 86 (for example, fuel may be limited in low airflow conditions). At block 92, actual flow values for the EGR system and turbocharging system, the air/fuel ratio, and chemical composition of the intake gasses are calculated. The calculations are based on a simplified combustion model and engine sensor inputs. The desired or set point values in block 90 are based on interpolation of values contained within five pairs of look up tables. The first table (94, 98) corresponds to stabilized turbocharger boost pressure and the second table (96, 100) corresponds to zero turbocharger boost pressure. That is, the first table corresponds to maximum air per fuel (per cycle) while the second table corresponds to minimum air per fuel. Depending on the current air per fuel as determined from various measurements, desired values are interpolated between the two tables for the particular operating value.

For example, desired carbon dioxide and air values are determined with an interpolation between tables 94 and 96 with each representing two look up tables, one table for $CO_2$ and one table for oxygen quantity/cycle. Similarly, desired values for timing parameters, quantity, and rail pressure are determined by interpolation (based on air per fuel) between tables 98 and 100 (block 98 and block 100 each represent three tables). In accordance with preferred embodiments of the present invention, controller 22 adjusts VGT and EGR operation to achieve the desired values at block 90 (calculated by interpolation) within the respective minimum/maximum tables (96, 100 and 94, 98, respectively).

Further at block 90, a desired carbon dioxide quantity 110 is determined. From block 92, an actual carbon dioxide quantity is estimated. It is appreciated that the quantities are preferably represented as mass per cycle. Summer 114 compares the desired carbon dioxide quantity 110 to the actual carbon dioxide quantity 112 to determine the carbon dioxide error signal. EGR valve 122 is controlled by an EGR command signal based on the error signal. Preferably, a controller, such as a proportional/integral/derivative controller 116 (or preferably with a non linear compensation term, for example, a Smith predictor) adjusts the EGR valve position to achieve a desired EGR rate and desired carbon dioxide quantity. Further, in preferred embodiments, EGR loop gain normalization is contained within block 120 to improve transient response by reducing the effects of rapid changes in torque demand.

Figure 3:
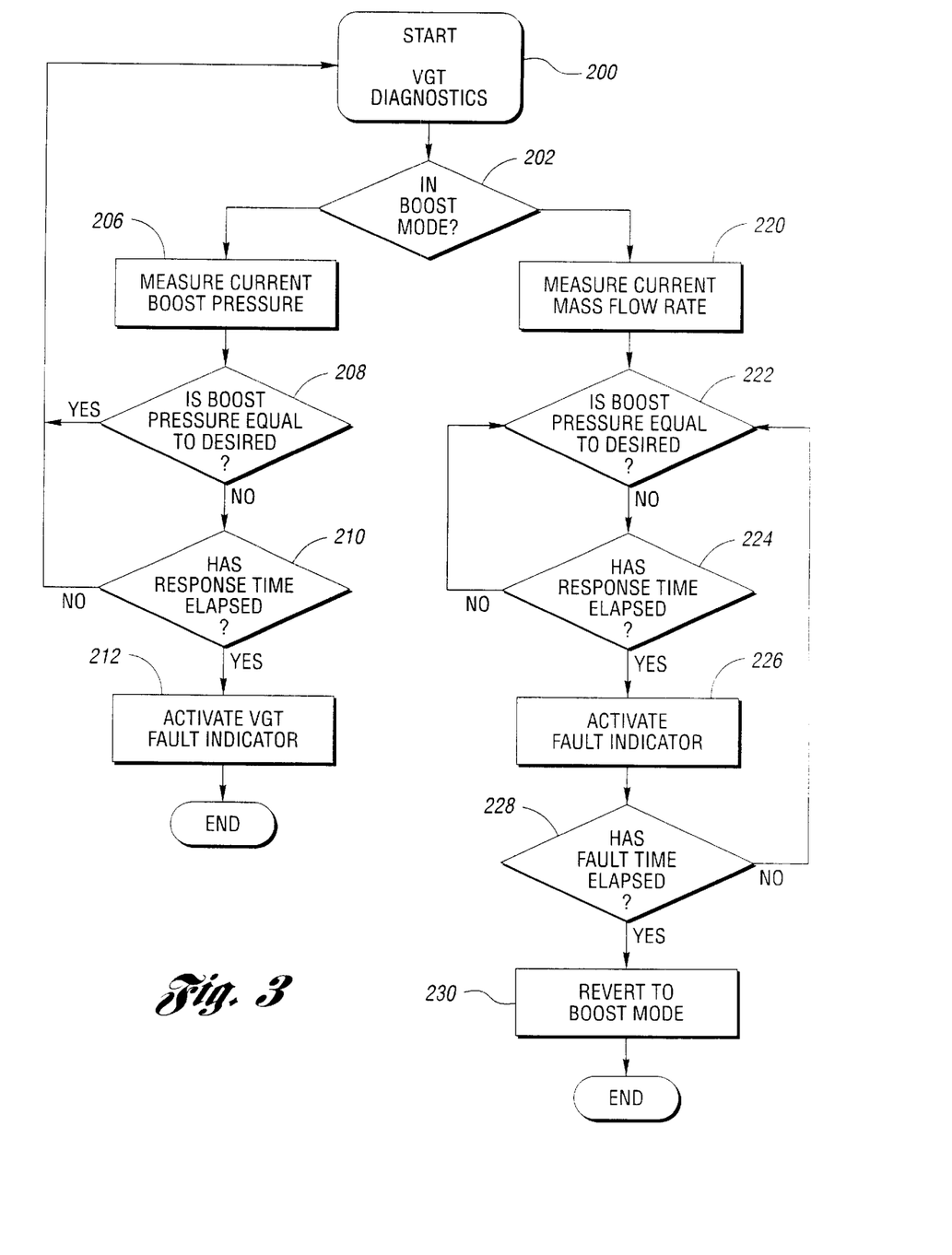
FIG. 3 is a block diagram illustrating operation of a system or method for VGT diagnostics and control according to one embodiment of the present invention.

After loop gain normalization, limiter 119 restricts the EGR command signal as needed to prevent excessive exhaust smoke during transient engine operation, as described in further detail in FIG. 3. The resultant EGR command signal is supplied by controller 22 (FIG. 1) to EGR valve 122. Preferably, the EGR command signal is also passed to the VGT control, as described below.

In controlling VGT 174, a base geometry (vane position in the preferred implementation), is determined at block 160 based on torque demand and engine speed. The base geometry block 160 serves as a feedforward feature for VGT control to improve transient response and also enable open loop control when desired as described further below The commanded base position is passed from block 160 to block 161. At block 162, a brake interface allows engine braking control logic to override a commanded base position by the normal VGT logic in the event that the engine is being operated as an engine brake.

The EGR command signal is received by lead compensation logic 140 to determine a lead compensated signal based on the EGR command signal. In embodiments of the present invention, this portion of the control loop synchronizes simultaneous EGR valve and VGT geometry control. Particularly, when EGR valve control alone is not sufficient to achieve desired EGR rate, the VGT geometry is modified to increase air flow through the turbine until the desired EGR flow is achieved. The lead term 140 improves transient response to compensate for the turbo boost lag. That is, when EGR valve control and VGT geometry control are not sufficient to achieve desired carbon dioxide content in the engine intake, increased flow through the turbine increases the overall air flow, but the turbine becomes less efficient, increasing the back pressure that drives carbon dioxide containing exhaust gasses through the recirculation path increasing the carbon dioxide mass per cycle at the intake.

At block 142, an additional compensation term based on EGR valve position modifies the lead compensator output. As shown, summer 144 receives a desired air per cycle signal and an actual air per cycle signal to determine an air error. Lead compensator 140 and additional compensator 142 anticipate and exaggerate the air error when it is expected that the EGR valve is opening. The air error determined at block 144 and/or the base geometry (for example vane position) as determined at block 160 are used to determine the VGT command signal.

Preferably, at block 148, normalization values contained within block 148 linearize the loop gain of PID controller 150, and serve as a variable switch between open and closed loop control approaches. That is, at low air flow conditions (low engine speed and low torque demand), the normalization factor reduces the air error to zero or to a sufficiently low value so as to be effectively insignificant in controlling VGT 174. That is, at low air flow conditions, normalization effectively eliminates the air error signal leaving the base geometry (the feedforward term) to control the VGT in an open loop fashion. On the other hand, once air flow reaches a sufficient level, the gain normalization factor jumps from zero to a sufficiently great value to control VGT 174 and linearize PID controller 150. As air flow continues to increase, the normalization factor decreases because at higher air flows, PID controller 150 is more effective. The gain normalization term is zero at low air flows. Air flow is preferably determined as a function of torque demand and engine speed. Once significant air flow exists, the gain normalization term is significantly increased to change from effectively pure open loop control of the VGT with the feedforward term to closed loop control of the VGT (with the feedforward term). As airflow continues to increase, the gain normalization term is reduced.

As shown by summer 152, the base vane position (or other suitable geometry indicator depending on the implementation) from block 160 provides the general control of the VGT command signal, while the signal derived from the air error provides fine tuning (except at low air flow conditions where the air error portion is effectively ignored and open loop control used). Limiter 170 limits the VGT command signal as needed to prevent turbo overspeeding. For example, at higher altitudes, continued demands for more oxygen may result in a turbo overspeed. This situation is prevented by turbo speed limit at block 172. After limiting, if necessary, the VGT command signal is applied to VGT 174. As explained above, the EGR command signal is utilized (with lead compensation) to adjust an air error signal to provide fine tuning of the VGT command signal. As such, continuous, simultaneous control of both the EGR and VGT systems allow the effects of these systems on each other to be taken into account during the control strategy. Lead term 140 improves transient response. Accordingly, the control loop also works in the opposite direction, adjusting the EGR valve position if a desired boost (or air/fuel ratio) is not achieved. For tables 94 and 96, at lower oxygen per fuel, the value in the minimum $CO_2$ table commands a desired carbon dioxide quantity of zero. The upper $CO_2$ table is desired $CO_2$ quantity at an upper oxygen per fuel ratio. The lower $CO_2$ defines a lower oxygen per fuel ratio at which desired $CO_2$ is zero. That is, when the engine is already running fuel rich, tables 94 and 96 are interpolated such that the desired carbon dioxide quantity is zero. As such, the function used to interpolate between the two carbon dioxide tables may be significantly different than the function used to interpolate between the two air quantity tables. Further, it is appreciated that the interpolation between any two tables is not limited to linear interpolation, but may take other forms.

Referring now to FIG. 3, a flow chart illustrating a method for diagnosing engine component failures according to one embodiment of the present invention is shown. More specifically, the embodiment illustrated in FIG. 3 may be used to determine whether the VGT circuit is functioning properly and control the engine and/or vehicle accordingly.

Block 200 initiates the VGT diagnostic routine. The controller determines whether the engine is currently operating in a turbo boost control mode or EGR control mode as represented by block 202. If the engine is operating in boost control mode, the controller determines the current boost pressure as represented by block 206. At block 208, the engine controller determines whether the current boost pressure is equal to a desired boost pressure corresponding to a desired base or steady boost+/−a boost response range. If the boost pressure is not within the desired boost pressure range and this condition exists for a predefined period of time as determined by block 210, then a VGT fault is indicated and a corresponding fault indicator light is activated as represented at block 212. If the current boost pressure is within the desired boost pressure range as determined by block 208, or the required time has not elapsed as determined by block 210, the logic continues to monitor the conditions as illustrated.

If the engine is in EGR control mode as determined by block 202, a current EGR mass flow rate is measured by an associated sensor or sensors as represented by block 220. At block 222, the engine controller determines whether the current EGR mass flow rate is equal to a desired EGR mass flow rate corresponding to a base rate+/−a minimum flow response. If the EGR mass flow rate is not within a desired mass flow rate range as determined by block 222, and this condition exists for a predefined period of time as determined by block 224, then an EGR fault indicator is activated as represented by block 226. Further, if this condition persists for a second predefined period of time as represented by block 228, the engine operating mode reverts back to boost control mode and the EGR valve is commanded to a closed position.

Figure 4:
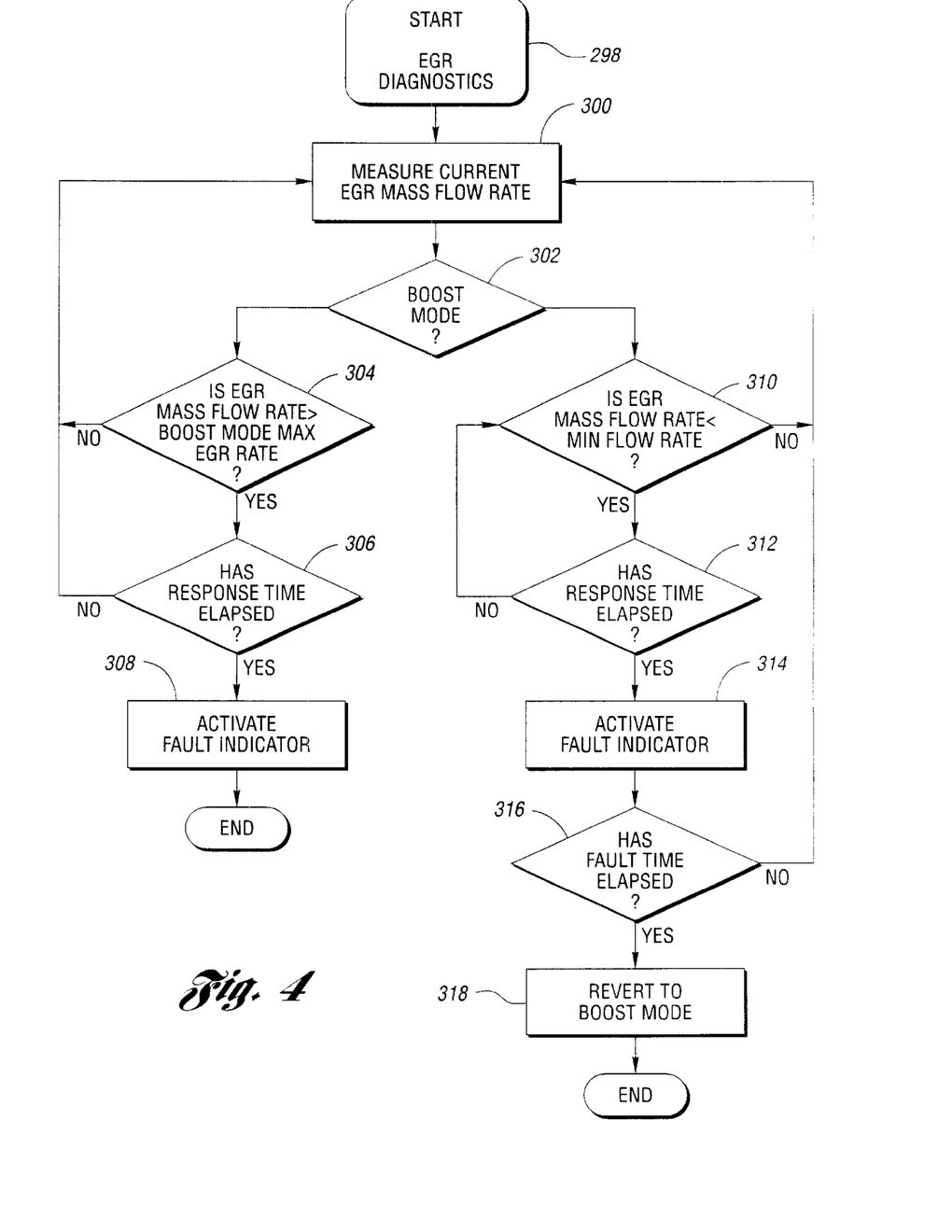
FIG. 4 is a flowchart illustrating operation of a system or method for EGR diagnostics and control according to one embodiment of the present invention.

FIG. 4 illustrates one embodiment for an EGR diagnostic routine according to the present invention. The EGR diagnostic routine is initiated as represented by block 298. A current EGR mass flow rate is sensed, as represented by block 300. At block 302, the operating mode is identified as being boost control mode or EGR control mode. When operating in boost control mode, block 304 determines whether the EGR mass flow rate exceeds a maximum EGR flow for boost mode. If the maximum boost mode EGR flow rate is exceeded for a calibratable period of time as represented by block 306, a corresponding fault code is activated which preferably illuminates the check engine light to alert the operator.

As also illustrated in FIG. 4, if the engine is operating in EGR control mode as determined by block 302, the EGR mass flow rate as determined by a corresponding sensor or sensors is compared to a corresponding minimum flow rate threshold at block 310. If the EGR mass flow rate is less than the corresponding minimum threshold for a predetermined period of time as determined by block 312, a corresponding fault is activated as represented by block 314. If this condition persists for another predetermined period of time as represented by block 316, the control mode reverts to boost control mode as represented by block 318.

As such, the present invention provides a system and method for diagnosis and control of interrelated engine components. In particular, the present invention provides a method for differentiating between VGT and EGR related faults and activating an appropriate fault code and modifying the engine control accordingly. More accurate fault codes may reduce the time necessary for service and maintenance personnel to troubleshoot and correct the root cause of any problem. In addition, engine control may be adjusted based on the fault to ameliorate the effects of a degraded or failed component.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for diagnosing a component failure in an internal combustion engine having exhaust gas recirculation and a variable geometry turbocharger cooperating to divert exhaust gas from an engine exhaust to an engine intake, the method comprising:
   determining whether the engine is operating in boost control mode or EGR control mode;
   comparing EGR flow rate to a threshold corresponding to the current control mode; and
   generating a fault if the EGR flow rate is outside an acceptable operating range based on the threshold for a first predetermined time period.

2. The method of claim 1 further comprising operating in boost control mode if the fault persists for a second predetermined time period.

3. The method of claim 1 wherein the engine is operating in the EGR control mode, the threshold corresponds to a minimum EGR flow rate, and wherein the step of comparing includes determining whether the EGR flow rate exceeds the threshold, the method further comprising:
   determining whether the EGR flow rate is within an acceptable operating range of a desired EGR flow rate; and
   wherein the step of generating a fault includes generating a VGT fault if the EGR flow rate is outside of the acceptable operating range but exceeds the minimum threshold.

4. The method of claim 3 wherein the step of generating a fault includes generating an EGR fault if the EGR flow rate is less than the minimum threshold.

5. The method of claim 1 wherein the engine is operating in the EGR control mode, the threshold corresponds to a minimum EGR flow rate, and wherein the step of comparing includes determining whether the EGR flow rate exceeds the threshold, the method further comprising:
   determining whether the EGR flow rate is within an acceptable operating range of a desired EGR flow rate; and
   wherein the step of generating a fault includes generating an EGR fault if the EGR flow rate is below the minimum EGR flow rate threshold.

6. The method of claim 5 wherein the EGR fault indicates that the EGR valve is inoperative.

7. The method of claim 5 wherein the step of generating a fault includes generating a VGT fault if the EGR flow rate is above the minimum EGR flow rate threshold but outside of the acceptable operating range.

8. The method of claim 6 wherein the VGT fault indicates VGT vanes are not responding as commanded.

9. A computer readable storage medium having stored data representing instructions executable by a computer to diagnose a component failure in an internal combustion engine having exhaust gas recirculation and a variable geometry turbocharger cooperating to divert exhaust gas from an engine exhaust to an engine intake, the computer readable storage medium comprising:
   instructions for determining whether the engine is operating in boost control mode or EGR control mode;
   instructions for comparing EGR flow rate to a threshold corresponding to the current control mode;
   instructions for generating a fault if the EGR flow rate is outside an acceptable operating range based on the threshold for a first predetermined time period; and
   instructions for operating in boost control mode if the fault persists for a second predetermined time period.

10. The computer readable storage medium of claim 9 wherein the engine is operating in the EGR control mode, the threshold corresponds to a minimum EGR flow rate, and wherein the instructions for comparing include instructions for determining whether the EGR flow rate exceeds the threshold, the computer readable storage medium further comprising:
    instructions for determining whether the EGR flow rate is within an acceptable operating range of a desired EGR flow rate; and
    wherein the instructions for generating a fault include instructions for generating a VGT fault if the EGR flow rate is outside of the acceptable operating range but exceeds the minimum threshold.

11. The computer readable storage medium of claim 10 wherein the instructions for generating a fault include instructions for generating an EGR fault if the EGR flow rate is less than the minimum threshold.

12. The computer readable storage medium of claim 9 wherein the engine is operating in the EGR control mode, the threshold corresponds to a minimum EGR flow rate, and wherein the instructions for comparing include instructions for determining whether the EGR flow rate exceeds the threshold, the computer readable storage medium further comprising:
    instructions for determining whether the EGR flow rate is within an acceptable operating range of a desired EGR flow rate; and
    wherein the instructions for generating a fault include instructions for generating an EGR fault if the EGR flow rate is below the minimum EGR flow rate threshold.

13. The computer readable storage medium of claim 12 wherein the EGR fault indicates that the EGR valve is inoperative.

14. The computer readable storage medium of claim 12 wherein the instructions for generating a fault include instructions for generating a VGT fault if the EGR flow rate is above the minimum EGR flow rate threshold but outside of the acceptable operating range.

15. The computer readable storage medium of claim 14, wherein the VGT fault indicates VGT vanes are not responding as commanded.

16. A system for diagnosing a component failure in an internal combustion engine, the system comprising:
    an exhaust gas recirculation circuit including an exhaust gas recirculation valve for diverting exhaust gas from an engine exhaust to an engine intake;
    an EGR sensor for measuring at least one parameter of the recirculated exhaust gas indicative of EGR flow;
    a turbocharger controllable to vary at least one turbocharger operating parameter in response to a command signal; and
    a controller in communication with the exhaust gas recirculation valve and the turbocharger, the controller determining whether the engine is operating in boost control mode or EGR control mode, comparing EGR flow rate to a threshold corresponding to the current control mode, generating a fault if the EGR flow rate is outside an acceptable operating range based on the threshold for a first predetermined time period.

17. The system of claim 16 wherein the controller generates an EGR fault if the EGR flow rate is less than the minimum threshold.

18. The system of claim 16 wherein the controller determines the engine is operating in the EGR control mode, the threshold corresponds to a minimum EGR flow rate, determines whether the EGR flow rate exceeds the threshold, determines whether the EGR flow rate is within an acceptable operating range of a desired EGR flow rate, and generates an EGR fault if the EGR flow rate is below the minimum EGR flow rate threshold.

19. The system of claim 16 wherein the controller determines the engine is operating in the EGR control mode, the threshold corresponds to a minimum EGR flow rate, the controller determines whether the EGR flow rate exceeds the threshold, determines whether the EGR flow rate is within an acceptable operating range of a desired EGR flow rate, and generates a VGT fault if the EGR flow rate is outside of the acceptable operating range but exceeds the minimum threshold.

20. The system of claim 19 wherein the step of generating a fault includes generating a VGT fault if the EGR flow rate is above the minimum EGR flow rate threshold but outside of the acceptable operating range.

* * * * *